(12) United States Patent
Araki et al.

(10) Patent No.: US 9,019,663 B2
(45) Date of Patent: Apr. 28, 2015

(54) TOLERANCE RING

(71) Applicant: NHK Spring Co., Ltd., Yokohama-shi (JP)

(72) Inventors: Toshimitsu Araki, Kanagawa (JP); Mitsuteru Mimura, Kanagawa (JP); Norihiro Tajima, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 14/367,525

(22) PCT Filed: Dec. 28, 2012

(86) PCT No.: PCT/JP2012/084233
§ 371 (c)(1),
(2) Date: Jun. 20, 2014

(87) PCT Pub. No.: WO2013/100153
PCT Pub. Date: Jul. 4, 2013

(65) Prior Publication Data
US 2014/0313618 A1 Oct. 23, 2014

(30) Foreign Application Priority Data

Dec. 28, 2011 (JP) ................................. 2011-290010

(51) Int. Cl.
*G11B 5/55* (2006.01)
*G11B 5/48* (2006.01)

(52) U.S. Cl.
CPC ................ *G11B 5/48* (2013.01); *G11B 5/4813* (2013.01); *G11B 5/5569* (2013.01)

(58) Field of Classification Search
USPC ........................................ 360/265.6; 403/372
See application file for complete search history.

(56) References Cited

U.S. PATENT DOCUMENTS

| 4,981,390 | A | * | 1/1991 | Cramer et al. ................. 403/371 |
| 7,580,225 | B2 | * | 8/2009 | Hanrahan et al. ........... 360/265.6 |
| 8,021,072 | B2 | * | 9/2011 | Court et al. .................... 403/372 |
| 8,482,882 | B2 | * | 7/2013 | Slayne et al. .............. 360/265.6 |
| 2007/0096572 | A1 | | 5/2007 | Watkins et al. |
| 2008/0043374 | A1 | | 2/2008 | Hanrahan et al. |
| 2013/0105267 | A1 | * | 5/2013 | Nakamura et al. ........... 192/56.1 |

FOREIGN PATENT DOCUMENTS

| JP | 05-205413 A | 8/1993 |
| JP | 2002-130266 A | 5/2002 |
| JP | 2002-130310 A | 5/2002 |
| JP | 2003-522912 A | 7/2003 |
| JP | 2007-305268 A | 11/2007 |
| WO | WO-01/59314 A1 | 8/2001 |

OTHER PUBLICATIONS

International Search Report mailed Mar. 19, 2013, issued for PCT/JP2012/084233.

* cited by examiner

*Primary Examiner* — Regina N Holder
*Assistant Examiner* — Carlos E Garcia
(74) *Attorney, Agent, or Firm* — Locke Lord LLP

(57) ABSTRACT

A tolerance ring is formed of a plate member, in a ring shape that is substantially circular along a predetermined direction, and provided with a plurality of protrusions projected radially in a circumferential direction, wherein an even number of the protrusions are arranged along the circumferential direction, and a plurality of straight lines that pass through a central portion of the plurality of protrusions and a center of a circle that circumscribes the tolerance ring cross one another.

13 Claims, 10 Drawing Sheets

TOLERANCE RING

FIELD

The present invention relates to a tolerance ring for use, for example, in hard disk devices.

BACKGROUND

Hard disk devices have hitherto been used in apparatuses for information processing such as computers. In recent years, the hard disk devices have been loaded not only as external storage devices for computers but also in home appliances such as television devices and video devices and electronic devices for automobiles.

In a conventional hard disk device 200 illustrated in FIG. 20, a drive mechanism is housed in a casing body 201. The drive mechanism includes a spindle 203 that rotationally drives a hard disk 202 which is a recording medium (the spindle 203 being rotated by a motor not illustrated), a carriage 205 that supports a magnetic head 204 for recording information on the hard disk 202 and reading out recorded information from the hard disk 202 and rotates on a plane of the hard disk 202, a VCM (voice coil motor) 206 that precisely rotates the carriage 205 to regulate scanning of the magnetic head 204, and a pivot shaft 207 that is fixed to the casing body 201 and connects the casing body 201 to the carriage 205. The pivot shaft 207 is, for example, in a substantially columnar form and has a construction of a bearing.

The carriage 205 rotates on a plane of the hard disk 202 with the pivot shaft 207 serving as a central axis. In this case, a tolerance ring is used for fixation between the carriage 205 and the pivot shaft 207. The fixation of the carriage 205 to the pivot shaft 207 prevents power, involved in the rotation of the carriage 205 by the VCM 206, from being conveyed to the casing body 201.

The tolerance ring is a ring that is formed of a flat member rolled along a predetermined direction to a substantially circular form. The tolerance ring is inserted into an opening on the carriage 205 side, and the pivot shaft 207 is then pressed into the tolerance ring. For this type of tolerance ring, a tolerance ring is disclosed that has a plurality of protrusion-shaped contacting parts protruded on the outer circumferential side (see, for example, Patent Literatures 1 to 4). In tolerance rings described in Patent Literatures 1 to 4, contacting parts are brought into pressure contact with the side surface of either the carriage 205 or the pivot shaft 207 for fixation between the carriage 205 and the pivot shaft 207.

CITATION LIST

Patent Literature

Patent Literature 1: JP 05-205413 A
Patent Literature 2: JP 2003-522912 W
Patent Literature 3: JP 2002-130310 A
Patent Literature 4: JP 2007-305268 A

SUMMARY

Technical Problem

In the conventional tolerance rings described in Patent Literatures 1 to 4, a variation width is expressed by $(k_{max}-k_{min})/k_{max}$ where $k_{min}$ represents a spring constant in the contacting part; and $k_{max}$ and $k_{min}$ represent a maximum value and a minimum value of the spring constant in the radial direction of the tolerance ring, respectively. When contacting parts that face each other are on a straight line passing through a center of the ring (when an angle between line segments that connect each contacting part to the center is 180°), the variation width is so large that the rigidity is high at some places while the rigidity is low at some places (unevenness of rigidity is increased), leading to a possibility that the stability of fixation between the carriage and the pivot shaft by the tolerance ring is lowered.

The present invention has been made in view of the above, and an object of the present invention is to provide a tolerance ring that can maintain the stability of fixation between a carriage and a pivot shaft.

Solution to Problem

To solve the above-described problem and achieve the object, a tolerance ring according to the present invention is formed of a plate member, in a ring shape that is substantially circular along a predetermined direction, and provided with a plurality of protrusions projected radially in a circumferential direction, wherein an even number of the protrusions are arranged along the circumferential direction, and a plurality of straight lines that pass through a central portion of the plurality of protrusions and a center of a circle that circumscribes the tolerance ring cross one another.

Moreover, in the above-described tolerance ring according to the present invention, when the protrusion is regarded as a spring, both ends of which are fixed respectively to the central portion of the protrusion and the center of the circumscribed circle, when the protrusions have an identical spring constant, and when the combined spring constant depending upon a rotation angle ($\theta$) around the center from a reference radial direction in the circumscribed circle is $K(\theta)$, the central portion of the plurality of protrusions is located at a position corresponding to any of a plurality of rotation angles $\theta$ that provide the maximum or minimum combined spring constant $K(\theta)$.

Moreover, in the above-described tolerance ring according to the present invention, when the number of the plurality of protrusions is $N_{a,b}=a \times 2^b$ where $a=1, 3, 5, \ldots$, $b=1, 2, \ldots$, each of the protrusions is provided in a radial direction rotated by an angle $\theta_{\alpha,\beta}$ defined in Equation (1) around the center of the circumscribed circle from a reference radial direction in the circumscribed circle:

$$\theta_{\alpha,\beta} = \alpha\theta_a + \beta\theta_b + m_{\alpha,\beta}\pi \qquad (1)$$

where $\theta_a = 2\pi/a$, $\theta_b = \pi/N_{a,b}$, $\alpha=0, 1, 2, \ldots$, $\beta=0, 1, 2, \ldots$, $m_{\alpha,\beta}=0, 1$, $\alpha \leq a-1$, and $\beta \leq 2b-1$.

Moreover, the above-described tolerance ring according to the present invention further includes a notch formed by cutting out, in a direction perpendicular to the circumferential direction, a portion from at least one peripheral side edge in a direction perpendicular to the circumferential direction.

Moreover, in the above-described tolerance ring according to the present invention, one or a plurality of the notches is/are provided at the one peripheral side edge.

Moreover, in the above-described tolerance ring according to the present invention, the radius of curvature at an edge in the circumferential direction is smaller than that of portions other than the edge in the circumferential direction.

Moreover, in the above-described tolerance ring according to the present invention, the radius of curvature decreases continuously from the portions other than the edge towards the edge.

Moreover, in the above-described tolerance ring according to the present invention, the plurality of protrusions are arranged along the circumferential direction, and among the protrusions arranged along the circumferential direction, the number of protrusions arranged in a row is multiples of 3.

Advantageous Effects of Invention

According to the present invention, in a tolerance ring including: a ring that is substantially circular along a predetermined direction; and a plurality of protrusions projected radially in the circumferential direction, a plurality of straight lines that pass through a central portion of the protrusions and a center of a circle that circumscribes the tolerance ring cross one another. By virtue of this constitution, the present invention has the effect of suppressing an increase in unevenness of rigidity and maintaining the stability of fixation between the carriage and the pivot shaft.

DESCRIPTION OF EMBODIMENTS

Figure 1:
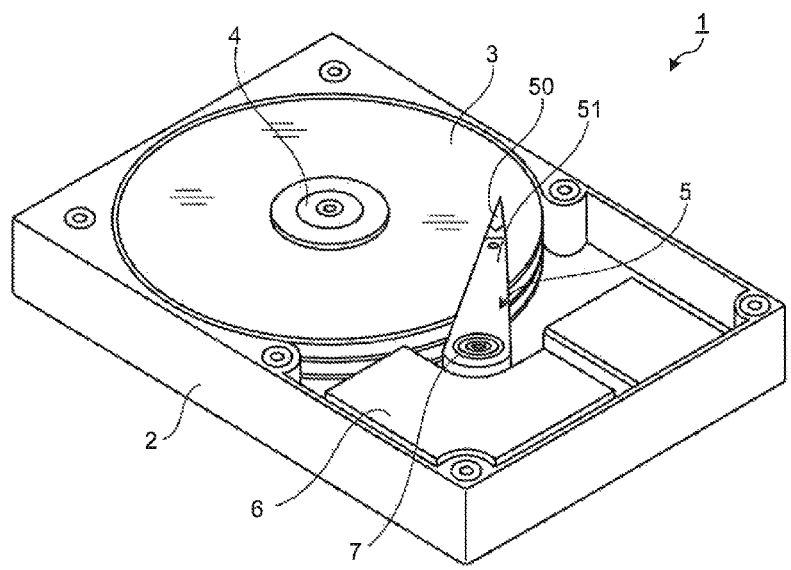
FIG. 1 is a perspective view illustrating a general construction of a hard disk device in an embodiment of the present invention.

Embodiments of the present invention will be described in more detail in conjunction with the accompanying drawings. The present invention is not limited by the following embodiments. Further, in the drawings referred to in the following description, the shape, size, and positional relationship are merely schematically illustrated to an extent necessary for understanding the content of the present invention. That is, the present invention is not limited by the shape, size, and positional relationship exemplified in the drawings only. In the following description, a hard disk device will be taken as an example of the tolerance ring.

FIG. 1 is a perspective view illustrating a general construction of a hard disk device in an embodiment of the present invention. A hard disk device 1 illustrated in FIG. 1 includes a drive mechanism housed in a casing body 2. The drive mechanism includes a spindle 4 that rotationally drives a hard disk 3 which is a recording medium, a carriage 5 that supports a magnetic head unit 50 for recording information on the hard disk 3 and reading out information from the hard disk 3 and rotates on a plane of the hard disk 3, a VCM 6 that precisely rotates the carriage 5 to control scanning of the magnetic head unit 50, and a columnar pivot shaft 7 that is fixed to the casing body 2 and connects the casing body 2 to the carriage 5. The pivot shaft 7 is, for example, in a substantially columnar form and has a construction of a bearing.

Figure 2:
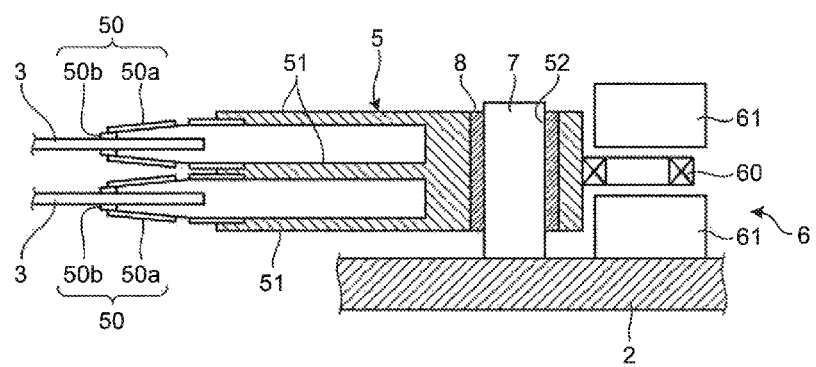
FIG. 2 is a partial cross-sectional view illustrating a construction of a principal part of the hard disk device illustrated in FIG. 1.
Figure 3:
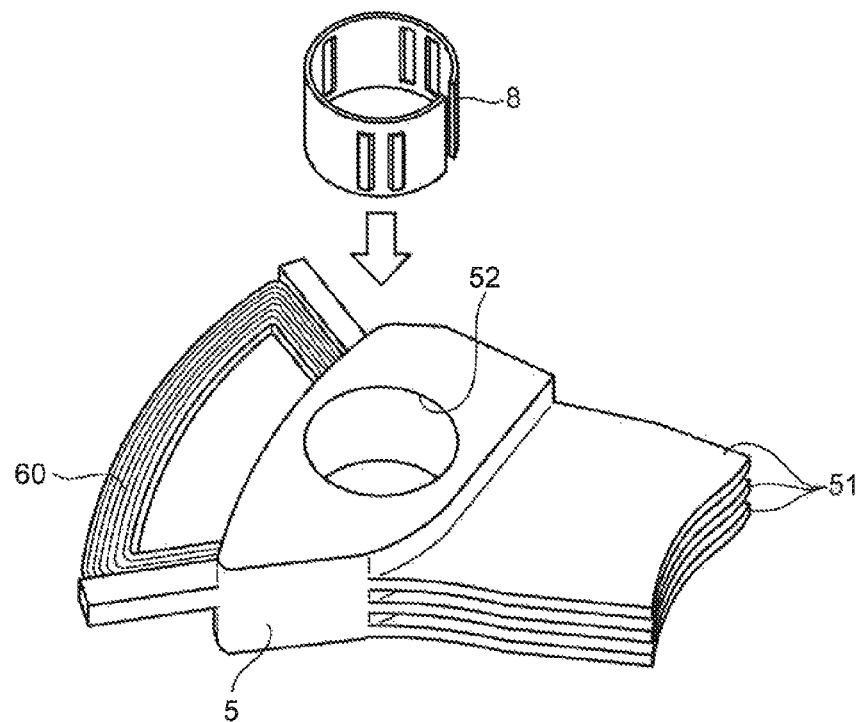
FIG. 3 is a perspective view illustrating a construction of a principal part of the hard disk device illustrated in FIG. 1.

FIG. 2 is a partial cross-sectional view illustrating a construction of a principal part of the hard disk device 1 illustrated in FIG. 1. FIG. 3 is a perspective view illustrating a construction of a principal part of the hard disk device 1 illustrated in FIG. 1. The carriage 5 includes an arm 51 that extends on a plane of the hard disk 3 and holds the magnetic head unit 50 at its front end, and a connector 52 that is connected to the pivot shaft 7 and has a columnar hollow space, of which the cross section has a somewhat larger diameter than that of the cross section of the pivot shaft 7. As illustrated in FIG. 2, the magnetic head unit 50 includes a suspension 50a that floats relative to the plane of the hard disk 3 by air flow formed by the rotation of the hard disk 3, and a magnetic head 50b that is provided at the end of the suspension 50a remote from a face ranging to an arm 51 and records information and reads out recorded information. When the hard disk device 1 has a plurality of hard disks 3, the carriage 5 has a plurality of magnetic head units 50 depending upon the number of hard disks 3.

The VCM 6 includes a coil 60 connected to an end side remote from the arm 51 side and two magnets 61 that hold the coil 60 therebetween. The VCM 6 drives the carriage 5 by force generated by a current and a magnetic field that flow through the coil 60. This allows the carriage 5 to be rotated on a plane of the hard disk 3 by power from the VCM 6 with the center of the pivot shaft 7 serving as a central axis to rotate the magnetic head unit 50 on the plane of the hard disk 3.

In this case, a tolerance ring 8 is used for fixation between the carriage 5 and the pivot shaft 7. The tolerance ring 8 is inserted into a hollow space in the connector 52 of the carriage 5, and the pivot shaft 7 is pressed into the tolerance ring 8 to fix the carriage 5 to the pivot shaft 7. In this case, the carriage 5 is rotatably fixed around a central axis in the longitudinal direction of the pivot shaft 7 that is a bearing. The fixation of the carriage 5 to the pivot shaft 7 prevents power, involved in the rotation of the carriage 5 by the VCM 6, from being conveyed to the casing body 2.

Figure 4:
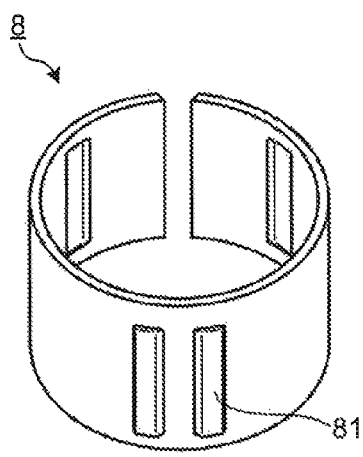
FIG. 4 is a perspective view illustrating a construction of a tolerance ring in the hard disk device illustrated in FIG. 1.
Figure 5:
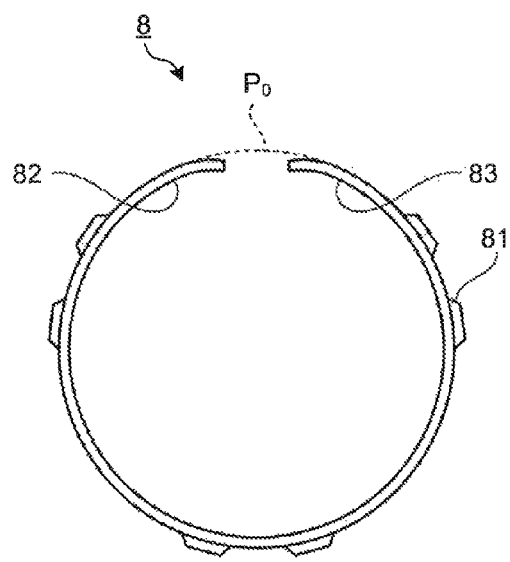
FIG. 5 is a side view illustrating a construction of a tolerance ring in the hard disk device illustrated in FIG. 1.

FIG. 4 is a perspective view illustrating a construction of a tolerance ring 8. FIG. 5 is a side view illustrating a construction of a tolerance ring 8. As illustrated in FIGS. 4 and 5, the tolerance ring 8 is formed of a plate-shaped stainless steel, is in a substantially ring form in the circumferential direction, and has a plurality of protrusions 81. The protrusions 81 are protruded in a substantially rectangular form in a radial direction on an outer surface of the tolerance ring 8. The protrusions 81 are provided in a row along the circumferential direction of the tolerance ring 8. The tolerance ring 8 is inserted into an opening on the carriage 5 side, and the pivot shaft 7 is then pressed into the tolerance ring 8. At that time, the protrusions 81 are brought into pressure contact with an internal wall surface of the connector 52 of the carriage 5 to fix the carriage 5 to the pivot shaft 7. The circumferential length of the tolerance ring 8 is preferably equal to the length of outer circumference in the opening in the connector 52. The protrusions 81 may be protruded towards an inner circumference along the radial direction.

In the tolerance ring 8, as illustrated in FIG. 5 (a side view), the radius of curvature of ends 82, 83 in the circumferential direction is different from the radius of curvature in portions other than the ends 82, 83 in the circumferential direction. Specifically, the radius of curvature of the ends 82, 83 in the circumferential direction is equal to the radius of curvature in the connector 52 of the carriage 5. The radius of curvature in the portions other than the ends 82, 83 in the circumferential direction is larger than the radius of curvature of the connector 52 of the carriage 5. In FIG. 5, a broken line $P_0$ represents a shape of circle having a radius of curvature in portions other than the ends 82, 83 in the circumferential direction (a shape of circumscribed circle). Thus, when the opened ends 82, 83 are closed upon the insertion of the tolerance ring 8 into the connector 52 of the carriage 5, the shape along the circumferential direction can be in the form of a circle having a radius of curvature that is substantially equal to the radius of curvature of the connector 52. The tolerance ring 8 is continuously curved so that the radius of curvature decreases from portions other than the ends 82, 83 towards the ends 82, 83.

Figure 6:
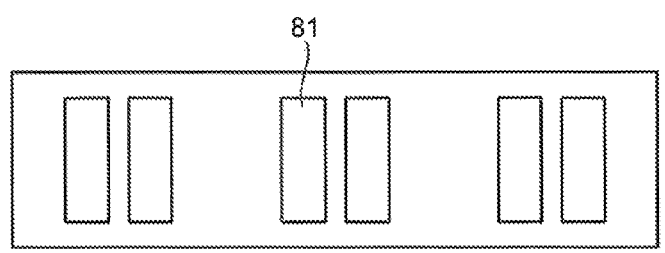
FIG. 6 is a schematic development view illustrating a construction of a tolerance ring in the hard disk device illustrated in FIG. 1.

FIG. 6 is a schematic development view of a construction of the tolerance ring 8 in the hard disk device 1 illustrated in FIG. 1, the tolerance ring 8 being stretched in the circumferential direction. As illustrated in FIG. 6, in the embodiment of the present invention, six protrusions 81 are provided in a row. The protrusions 81 in the tolerance ring 8 are arranged along the longitudinal direction of a main surface.

The protrusions 81 are arranged in a row by an even number that is in multiples of 3. In the arrangement of the protrusions 81 in multiples of 3, for example, the protrusions 81 are brought into contact with an abutted side surface in 120° symmetry, a load applied to the side surface of the connector 52 is substantially even, and thus, the operation efficiency of the bearing can be maintained with high accuracy. In the embodiment of the present invention, six protrusions 81 are provided.

Figure 7:
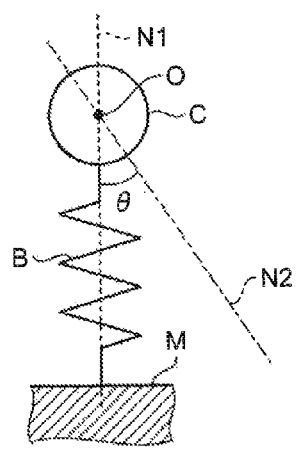
FIG. 7 is a schematic explanatory view illustrating a construction of a principal part of the hard disk device illustrated in FIG. 1.

FIG. 7 is a schematic explanatory view of a construction of a principal part of the hard disk device illustrated in FIG. 1. FIG. 7 is a diagram that the carriage 5, the protrusions 81, and the pivot shaft 7 are modeled as a carriage C, protrusions B, and a pivot shaft M, respectively, and the protrusions B are regarded as a spring, both ends of which are fixed to a central portion of the protrusions 81 and a center of a circle that circumscribes the tolerance ring 8. The protrusions B have a spring constant of k. The angle between an incline axis N2 and an axis N1 (a radial reference) that passes through a center O of the carriage C (a center of a circumscribed circle of the tolerance ring) and passes through each contact point between the carriage C and the pivot shaft M in the protrusions B (a central portion of the protrusions 81) is θ.

In this case, when the spring constant in the direction of the axis N2 is $k_θ$, $k_θ$ is expressed by Equation (2):

$$k_θ = k|\cos θ| \qquad (2)$$

Figure 8:
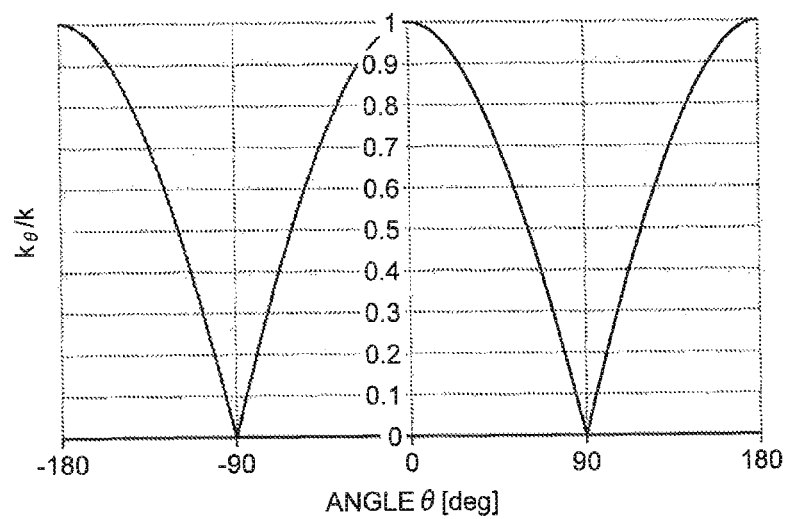
FIG. 8 is a graph illustrating a relationship between an angle and a spring constant ratio in a tolerance ring in an embodiment of the present invention.

FIG. 8 is a graph illustrating a relationship between an angle θ and a spring constant ratio $k_θ/k$ in a tolerance ring in an embodiment of the present invention. As illustrated in FIG. 8, when the angle θ is 90° (−90°), the spring constant ratio $k_θ/k$ ($k_θ$:spring constant) is 0 (zero). Specifically, the angle θ in the protrusions B is 90° (when the axis N2 is inclined by 90° against the axis N1), the load applied to the direction of the axis N1 that is applied to the axis N2 is 0 (zero). This is true of when θ is −90°.

A plurality of protrusions B are provided in the tolerance ring. In this case, when the plurality of protrusions B are provided at equal intervals over 3600 and rotation is made by an rotation angle θ from a reference in one radial direction, the combined spring constant K(θ) in a radial direction (hereinafter referred to simply as K) is expressed by Equation (3). The combined spring constant K depends upon a rotation angle θ around the center from a reference radial direction in a circumscribed circle.

$$K(θ) = \sum_{n=1}^{N} k \left| \cos\left(\frac{360(n-1)}{N} + θ\right) \right| \qquad (3)$$

where N represents the number of protrusions B, and n represents numbers attached to the protrusions B. In the embodiment of the present invention, the provision of the protrusions at equal intervals on the circumscribed circle of the tolerance ring is called "equal-interval arrangement." The spring constant in the protrusions is identical.

Figure 9:
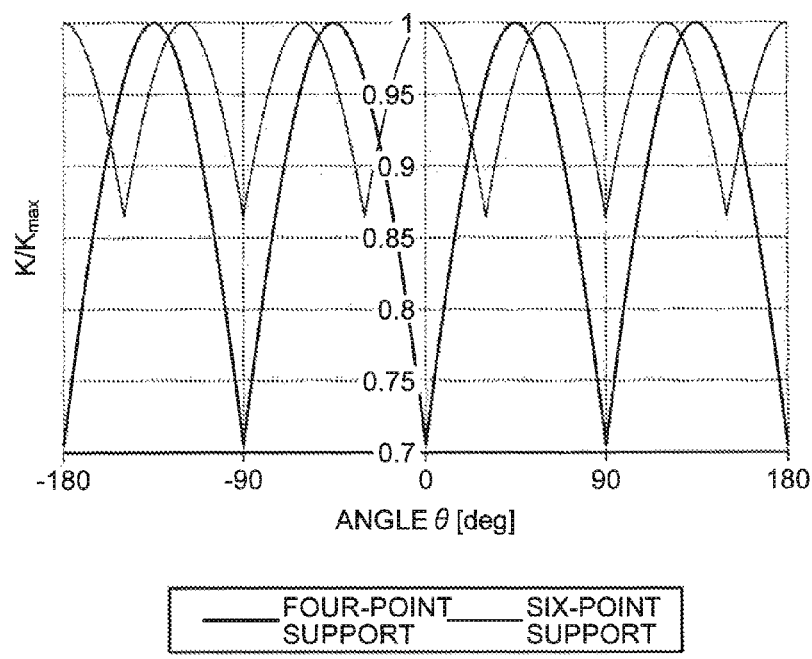
FIG. 9 is a graph illustrating a relationship between an angle and a spring constant ratio in a tolerance ring in an embodiment of the present invention.
Figure 10:
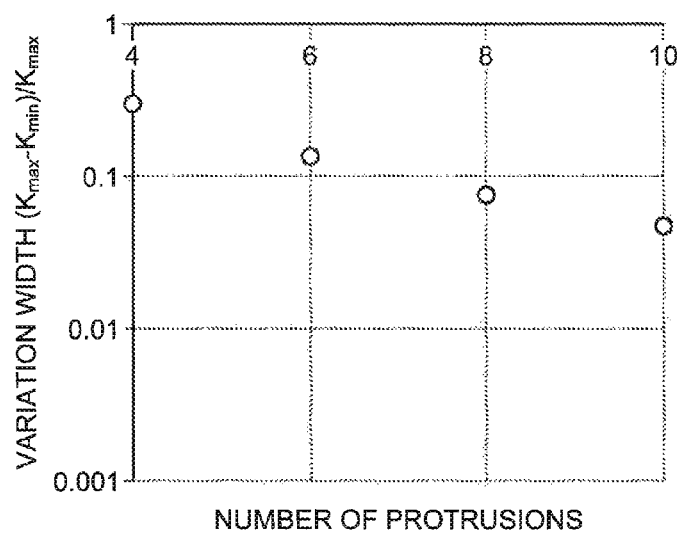
FIG. 10 is a graph illustrating a relationship between the number of protrusions and a variation width in a tolerance ring in an embodiment of the present invention.

In n=4 or 6 (four- or six-point support), when the maximum value of K in Equation (3) is $K_{max}$, the relationship between the angle θ and the combined spring constant ratio $K/K_{max}$ is as a graph illustrated in FIG. 9. When the minimum value of K in Equation (3) is $K_{min}$, the relationship between the number of the protrusions B and the variation width, $(K_{max}-K_{min})/K_{max}$, is as a graph illustrated in FIG. 10.

As can be seen from the graph illustrated in FIG. 9, when the protrusions B are provided at equal intervals, also in the combined spring constant ratio, the maximum value ($K/K_{max}=1$) and the minimum value appear in a predetermined period. Further, as can be seen from the graph illustrated in FIG. 10, when the number of the protrusions B is even, the variation width decreases with an increase in the number of the protrusions B.

Figure 11:
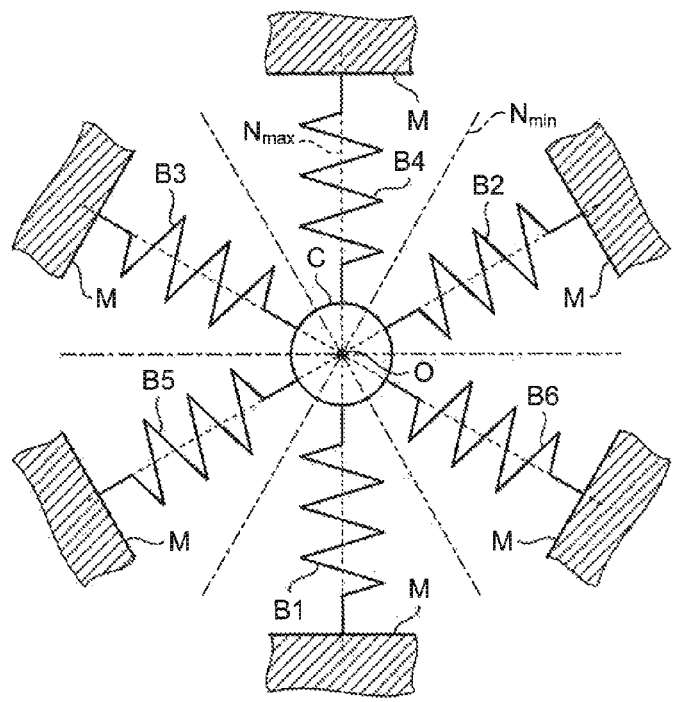
FIG. 11 is a schematic explanatory view illustrating a construction of a principal part of the hard disk device illustrated in FIG. 1.

FIG. 11 is a schematic explanatory view illustrating a construction of a principal part of the hard disk device illustrated in FIG. 1. FIG. 11 illustrates a case where the carriage C and the pivot shaft M are supported by six protrusions B1 to B6.

The protrusions B1 to B6 illustrated in FIG. 11 are provided at equal intervals on a circumscribed circle.

A broken line illustrated in FIG. 11 represents a straight line $N_{max}$ that passes through a center O of the carriage C and passes through each contact point between the carriage C and the pivot shaft M in the protrusions B. In the equal-interval arrangement, the straight line $N_{max}$ is identical to a radial direction in which, when one radial direction is a reference, a combined spring constant ratio $K/K_{max}$, that is, a combined spring constant K, becomes maximum (a rotation angle θ). A dashed dotted line illustrated in FIG. 11 represents a straight line $N_{min}$ that passes through the center O of the carriage C and is identical to a radical direction in which, when one radial direction is a reference, a combined spring constant ratio $K/K_{max}$, that is, a combined spring constant K, becomes minimum (a rotation angle θ), relative to a straight line $N_{max}$ in which the combined spring constant K becomes maximum.

In this case, when six protrusions B1 to B6 are provided at equal intervals on a circumscribed circle, for example, the six protrusions B1 to B6 are provided on a broken line (a straight line $N_{max}$). The arrangement of the six protrusions B1 to B6, however, is identical to an arrangement that provides a maximum combined spring constant ratio K/KY (on the straight line $N_{max}$) but not an arrangement that reinforces the position where the combined spring constant ratio is minimum (on the straight line $N_{min}$). Accordingly, when the six protrusions B1 to B6 are arranged at equal intervals on the circumscribed circle, two protrusions face each other on an identical line (on a straight line $N_{max}$) and the minimum value $K_{min}$ originally obtained in the straight line $N_{max}$ and the straight line $N_{min}$ varies, resulting in an increased variation width $(K_{max}-K_{min})/K_{max}$.

Figure 12:
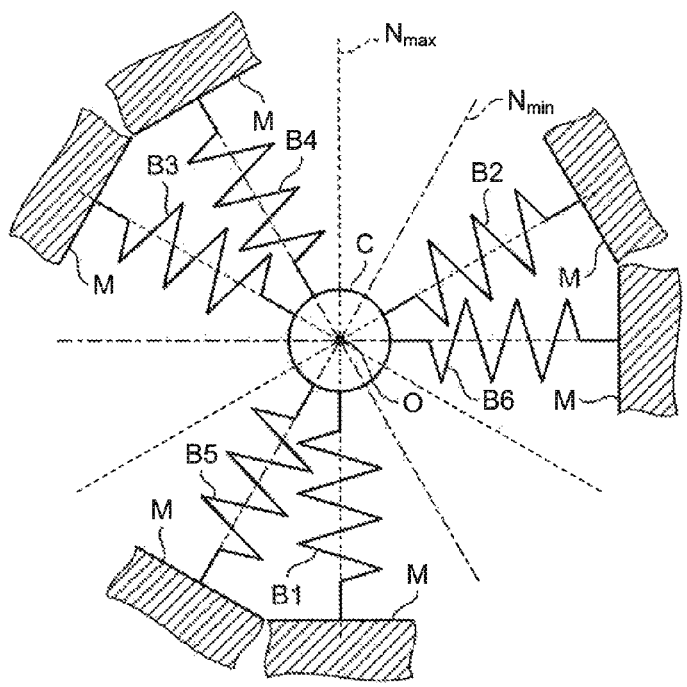
FIG. 12 is a schematic explanatory view illustrating a construction of a principal part of the hard disk device illustrated in FIG. 1.

By contrast, in the embodiment of the present invention, when the number of protrusions is even, half of the protrusions (protrusions B1 to B3) are arranged at positions where a circumscribed circle is divided equally, among positions corresponding to a plurality of rotation angles θ that provide a maximum combined spring constant K while the remaining half of protrusions (protrusions B4 to B6) are arranged at positions where the circumscribed circle is divided equally, among positions corresponding to a plurality of rotation angles θ that provide a minimum combined spring constant K. Specifically, as illustrated in FIG. 12, three protrusions B1 to B3 among the six protrusions B1 to B6 are arranged at equal intervals on the straight line $N_{max}$ while the remaining three protrusions B4 to B6 are arranged at equal intervals on the straight line $N_{min}$. In the embodiment of the present invention, this arrangement is called "optimal arrangement."

Figure 13:
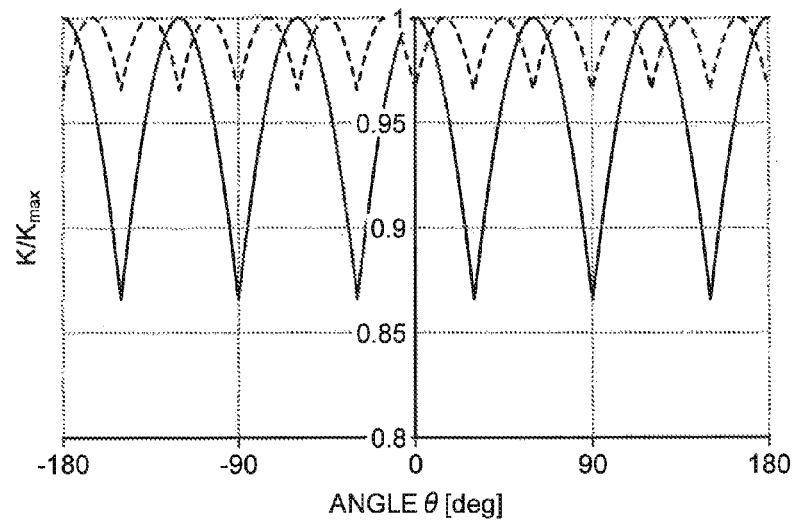
FIG. 13 is a graph illustrating an example of a relationship between an angle and a spring constant ratio in a tolerance ring in an embodiment of the present invention.

FIG. 13 is a graph illustrating one example of a relationship between a rotation angle θ and a spring constant ratio $K/K_{max}$ in a tolerance ring in an embodiment of the present invention and illustrates the relationship between the rotation angle θ and the spring constant ratio $K/K_{max}$ for the equal-interval arrangement and the optimal arrangement.

As illustrated in FIG. 13, for the optimal arrangement, the minimum value of the combined spring constant ratio $K/K_{max}$ is larger than that for the equal-interval arrangement, whereby, for the optimal arrangement, the variation width is smaller than that for the equal-interval arrangement, and thus, lowering in radial rigidity can be suppressed.

Figure 14:
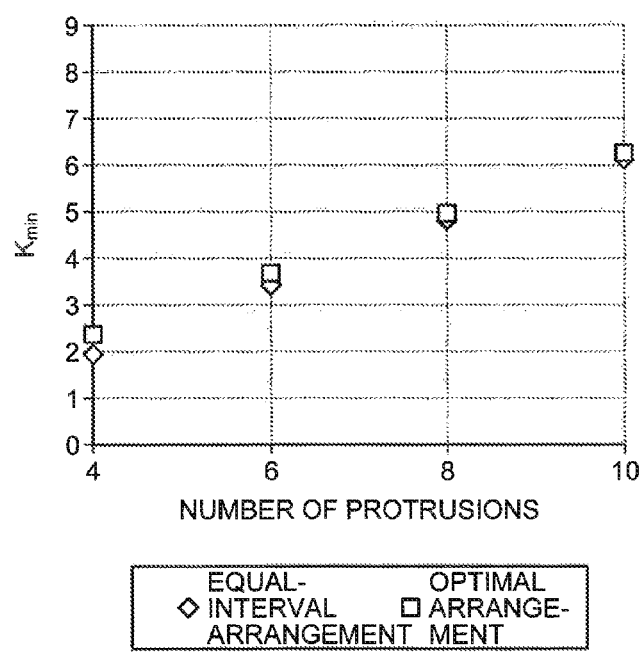
FIG. 14 is a graph illustrating a relationship between the number of protrusions and a variation width in a tolerance ring in an embodiment of the present invention.

FIG. 14 is a graph illustrating a relationship between the number of protrusions and the minimum value $K_{min}$ of the combined spring constant K in the tolerance ring in an embodiment of the present invention where k=1. As illustrated in FIG. 14, when the number of protrusions is even, the minimum value $K_{min}$ in the optimal arrangement is larger than the minimum value $K_{min}$ in the equal-interval arrangement.

Figure 15:
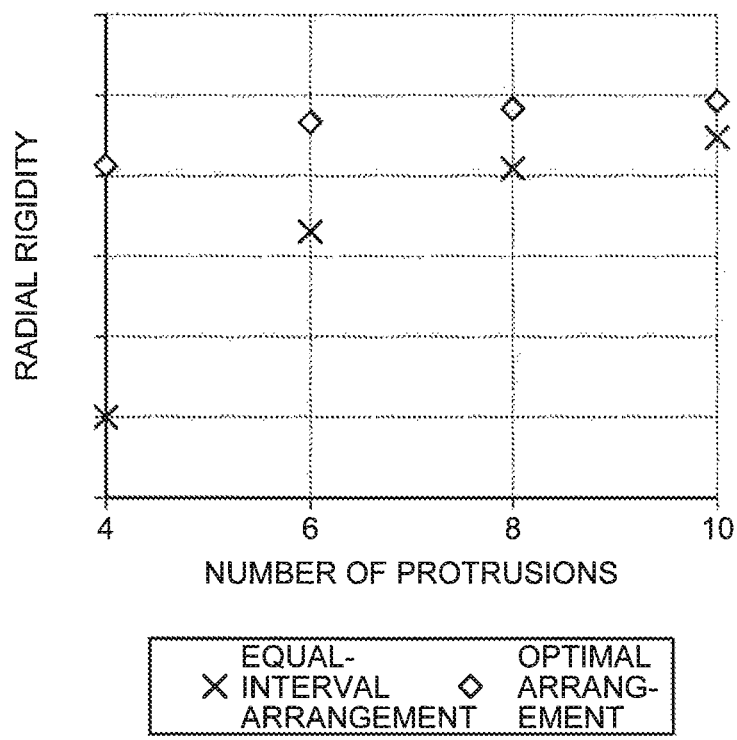
FIG. 15 is a graph illustrating one example of a relationship between the number of protrusions and radial rigidity in a tolerance ring in an embodiment of the present invention.

FIG. 15 is a graph illustrating one example of a relationship between the number of protrusions and the radial rigidity in the tolerance ring in an embodiment of the present invention. As illustrated in FIG. 15, the radial rigidity for the optimal arrangement is larger than the radial rigidity for the equal-interval arrangement, whereby the stability of fixation between the carriage 5 and the pivot shaft 7 can be maintained.

In the optimal arrangement, the protrusions are provided in a radial direction rotated by a rotation angle $\theta_{\alpha,\beta}$ defined in Equation (1). The rotation angle $\theta_{\alpha,\beta}$ is a rotation angle around the center of the circumscribed circle from a reference radial direction in the circumscribed circle in the tolerance ring. When the number N of the plurality of protrusions is $N_{a,b}=a\times 2^b$ where a=1, 3, 5, ..., b=1, 2, ..., provided that $N_{a,b} \geq 4$, the rotation angle $\theta_{\alpha,\beta}$ is expressed by $$\theta_{\alpha,\beta}=\alpha\theta_a+\beta\theta_b+m_{\alpha,\beta}\pi \qquad (1)$$

where $\theta_a=2\pi/a$, $\theta_b=\pi/N_{a,b}$, α=0, 1, 2, ..., β=0, 1, 2, ..., $m_{\alpha,\beta}$=0, 1, α≤a−1, and β≤2b−1.

A plurality of protrusions 81 are arranged based on the rotation angle $\theta_{\alpha,\beta}$ calculated by Equation (1). Since the calculated angle $\theta_{\alpha,\beta}$ is against a predetermined circle, either an arrangement that ends of a ring-shaped tolerance ring are joined to each other to form a circumscribed circle in the circumferential direction, or an arrangement that is tailored to a circular shape in an opening in the carriage 5 that is an insertion object may be properly set for the provision of the protrusions 81. In this case, when the number of the protrusions 81 is even and, in each of the protrusions 81, $m_{\alpha,\beta}$=0, it may be considered that a plurality of protrusions consist of a group, and groups are arranged at equal intervals. For example, when the number of protrusions 81 is six (a=3 and b=1), as three groups (a=3) that each consists of two ($2^b$) protrusions 81, these three groups that are uneven are arranged at equal intervals. In Equation (I), according to the values of $m_{\alpha,\beta}$, the protrusions 81 may also be arranged respectively at 180°-rotated positions.

The tolerance ring 8 can be manufactured, for example, by the following method. In this manufacturing method, a progress press is used in which the steps are successively applied to a base metal extended in a strip form. A base metal extended in a flat form is pressed for contour shaping treatment to regulate the outer shape (outer edge) of the tolerance ring 8 and to mold a base material constituting an outer shape of the tolerance ring 8. In this case, in order to prevent the separation of the base material from the base metal, the connection between the base material and the base metal is maintained by a runner. The molded base material is molded for the formation of protrusions 81. The protrusions 81 are formed by a press at the positions.

Subsequently, the base material with the protrusions 81 formed thereon by molding is subjected to curving. In this curving step, the base material is curved stepwisely from both end sides along the longitudinal direction of the main surface of the base material so as for the protrusions 81 to be located on an outer surface side and molded in such a manner that the radius of curvature of ends 82, 83 in the circumferential direction is smaller than the radius of curvature of portions other than the ends 82, 83 in the circumferential direction. In this case, preferably, the base material is curved so that the radius of curvature decreases continuously (multi-stepwisely) from portions other than ends 82, 83 towards the ends 82, 83.

After the completion of the curving step, the base material thus obtained is trimmed. In the trimming, a tolerance ring 8 can be obtained by cutting off the base material from the runner. After the trimming, the tolerance ring 8 may be subjected to treatment (setting treatment) in which a stress that is more than the maximum service stress is applied.

In the embodiments of the present invention, when the number of protrusions 81 provided is even, the protrusions 81 are provided so as to be located on such an axis that the combined spring constant is maximum and at such positions that the combined spring constant is minimum, whereby an increase in unevenness of rigidity can be suppressed to maintain the stability of fixation between the carriage 5 and the pivot shaft 7.

In the embodiments of the present invention, since the radius of curvature of ends 82, 83 in the circumferential direction is equal to the radius of curvature of the connector 52 of the carriage 5 and, at the same time, the radius of curvature of portions other than the ends 82, 83 in the circumferential direction is larger than the radius of curvature of the connector 52 of the carriage 5, when inserted into the connector 52 of the carriage 5, the tolerance ring 8 can be held within the connector 52 and the shape of the tolerance ring 8 in the circumferential direction can be made circular along the wall surface of the connector 52. For this reason, the tolerance ring 8 can be inserted into the connector 52 of the carriage 5 without damage to the wall surface of the connector 52. Accordingly, the occurrence of contamination involved in the insertion of the tolerance ring 8 can be suppressed.

In the conventional tolerance ring, the shape along the circumferential direction is elastically deformable in a substantially circular form that is substantially equal to an opening on the carriage side. In fact, however, for assembling work reasons, the tolerance ring needs to be held within the carriage, and thus, the radius of curvature of the tolerance ring is designed to be larger than the radius of curvature of an opening in the carriage. For production reasons, in some cases, the end side of the tolerance ring is opened, and the radius of curvature of the end of the tolerance ring is larger than the radius of curvature of the opening in the carriage. Thus, in the insertion of the opening in the carriage, the shape along the circumferential direction of the elastically deformed tolerance ring is elliptical. For this reason, when the pivot shaft and the like are pressed into the tolerance ring, there is a possibility that the side surface of the pivot shaft is brought into contact with an outer edge on a minor axis side of an elliptical shape in the tolerance ring, and an outer edge of the tolerance ring and/or the side surface of the pivot shaft are damaged, leading to the occurrence of contamination.

By contrast, in the tolerance ring 8 in the embodiments of the present invention, the shape along the circumferential direction is circular along the wall surface of the connector 52, and thus, the tolerance ring 8 can be inserted into the connector 52 without damage to the wall surface of the connector 52. When the pivot shaft 7 is pressed into the tolerance ring 8, the pivot shaft 7 can be pressed into the tolerance ring 8 without damage to the internal circumferential surface of the tolerance ring 8 and/or the side surface of the pivot shaft 7. Accordingly, the occurrence of contamination by the tolerance ring 8 can be suppressed.

As described above, in the tolerance ring 8 in the embodiments of the present invention, the pivot shaft 7 can easily be pressed into the tolerance ring 8, and the carriage 5 can be reliably fixed to the pivot shaft 7 by pressure contact of the protrusions 81 with the wall surface of the connector 52.

The embodiments have been explained on an assumption that, when the number of protrusions provided is even, the protrusions are arranged on a straight line that provides a maximum spring constant (a spring constant ratio) or on a straight line that provides a minimum spring constant (a spring constant ratio). The effect can be obtained when the protrusions arranged on an axis that provides a minimum combined spring constant (a spring constant ratio) are arranged at positions that do not coincide with an axis that provides a maximum combined spring constant (a spring constant ratio). Specifically, the protrusions may be provided at positions where straight lines that connect the central portion of each of the protrusions to the center of the tolerance ring and pass through the center of the ring cross each other. Positions where the straight lines cross each other are preferably a part of positions corresponding to a plurality of rotation angles θ that provide a maximum or minimum combined spring constant K.

Further, the shape of the protrusions 81 in the tolerance ring 8 has been explained as being protruded in a substantially rectangular form from an outer surface. However, the shape of the outer edge in the direction of protrusion may be substantially circular, or alternatively the shape of the outer edge in a region protruded from the outer surface may be substantially circular, as long as the requirement for the number of protrusions is satisfied and fixation between members is possible. The protrusions 81 have been explained as being provided along the circumferential direction of the tolerance ring 8. The present invention, however, is not limited to this arrangement, and the protrusions 81 may be arranged in a plurality of rows, that is, two or more rows.

The tolerance ring 8 has been explained as being curved in such a manner that the radius of curvature decreases continuously (multi-stepwisely) from portions other than ends towards the ends 82, 83. However, two-step curving in the radius of curvature at the ends and in the radius of curvature at portions other than the ends is possible.

The optimal arrangement in the embodiments of the present invention have been explained as being such that, when the number of protrusions is even (six, a=3 and b=1), three protrusions B1 to B3 are arranged at equal intervals on a straight line $N_{max}$ while the remaining three protrusions B4 to B6 are arranged at equal intervals on a straight line $N_{min}$. However, 180-degree equal-interval arrangement can be applied as long as the effect of preventing an increase in the variation width can be attained. For example, in Equation (1), when the number of protrusions is a power of 2 (a=1), the protrusions are located at positions corresponding to 180-degree equal-interval arrangement. In this case, the number of groups is one (a=1), and it can be considered that the protrusions are arranged within this group.

Figure 16:
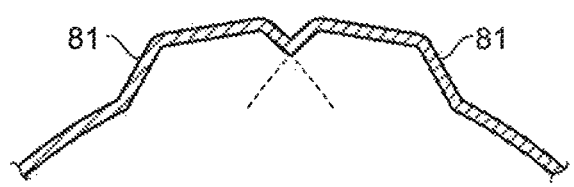
FIG. 16 is a schematic cross-sectional view illustrating a construction of a principal part of a tolerance ring in a hard disk device in a first modification of an embodiment of the present invention.

When the number of protrusions is large or when the length of the tolerance ring in the circumferential direction in the protrusions is long and, at the same time, when adjacent protrusions overlap with each other, as in the first modification illustrated in FIG. 16, adjacent protrusions 81 may overlap with each other. In this case, the protrusions 81 are different from each other at least in the position of the central portion.

Figure 17:
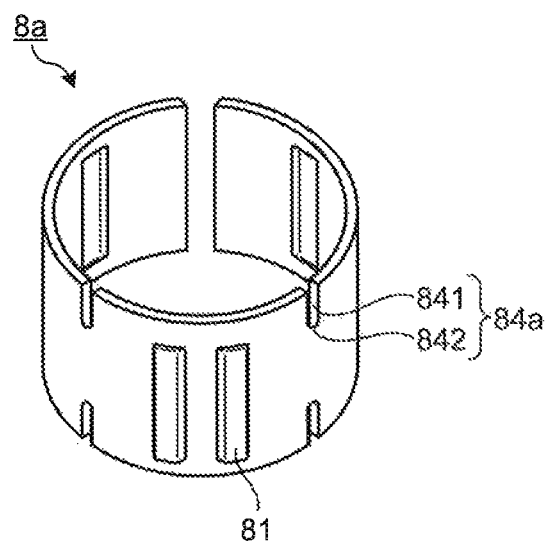
FIG. 17 is a schematic perspective view illustrating a construction of a tolerance ring in a hard disk device in a second modification of an embodiment of the present invention.

FIG. 17 is a schematic perspective view illustrating a construction of a tolerance ring in a hard disk device in a second modification of an embodiment of the present invention. A tolerance ring 8a in the second modification has the protrusions 81 and, in addition, two notches 84a notched in a direction perpendicular to the circumferential direction (and plate-thickness direction). The notch 84a includes an extended portion 841 extended from a base end (an end in a direction perpendicular to the circumferential direction and the plate-thickness direction) and an arc-shaped front end 842 that is provided on the end side remote from the base end side of the extended portion 841 and has a predetermined diameter (a radius of curvature). The diameter of the arc at the front end 842 (diameter of curvature) is equal to the width in the circumferential direction in the extended portion 841.

Here in the conventional tolerance ring, in the insertion of a pivot shaft into a tolerance ring inserted and fitted into a carriage, when the pivot shaft reaches protrusion formation positions, the diameter of the tolerance ring is expanded along the diameter of the pivot shaft. In this case, in the tolerance ring, the diameter of the end on the pivot shaft insertion side is expanded, and, with its rebound, the diameter of the other end is reduced. When a change in diameter occurs at both ends of the tolerance ring, the end opposite to the insertion side is lifted. When the pivot shaft is further inserted from this state and the insertion is completed, the axis of the carriage is rotated against the central axis of the pivot shaft and is consequently brought to an inclined state, posing a problem of an influence on assembling accuracy of a drive mechanism.

On the other hand, in the second modification, a notch notched in a direction perpendicular to a circumferential direction (and a plate-thickness direction) of the tolerance ring 8a is provided. By virtue of this construction, when the pivot shaft 7 is inserted into the tolerance ring 8a and reaches the protrusions 81, even in the expansion of the diameter of the end on the pivot shaft 7 insertion side of the tolerance ring 8a, conforming to the diameter expansion can prevent lifting of the end opposite to the insertion side, and the rotation of the carriage 5 relative to the pivot shaft 7 can be suppressed. Thus, the drive mechanism in the hard disk device 1 can be accurately assembled.

In the second modification 2, since the protrusions are arranged at positions as described in the embodiment, an increase in unevenness of rigidity is suppressed and the stability of fixation between the carriage and the pivot shaft can be maintained.

Figure 18:
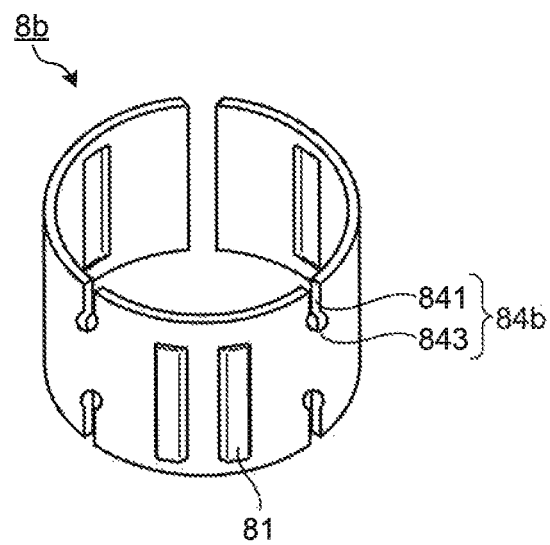
FIG. 18 is a schematic perspective view illustrating a construction of a tolerance ring in a hard disk device in a third modification of an embodiment of the present invention.

FIG. 18 is a schematic perspective view illustrating a construction of a tolerance ring in a hard disk device in a third modification of an embodiment of the present invention. In the first modification, the diameter of the R shape at the front end 842 has been described as being equal to the width in the circumferential direction in the extended portion 841. However, the notch 84b may have a front end 843 having a diameter that is larger than the width in the circumferential direction, as in a tolerance ring 8b illustrated in FIG. 18.

Figure 19:
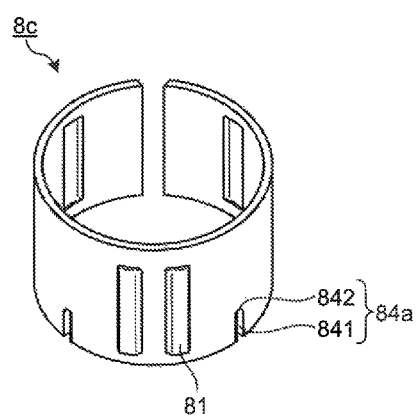
FIG. 19 is a schematic perspective view illustrating a construction of a tolerance ring in a hard disk device in a fourth modification of an embodiment of the present invention.
Figure 20:
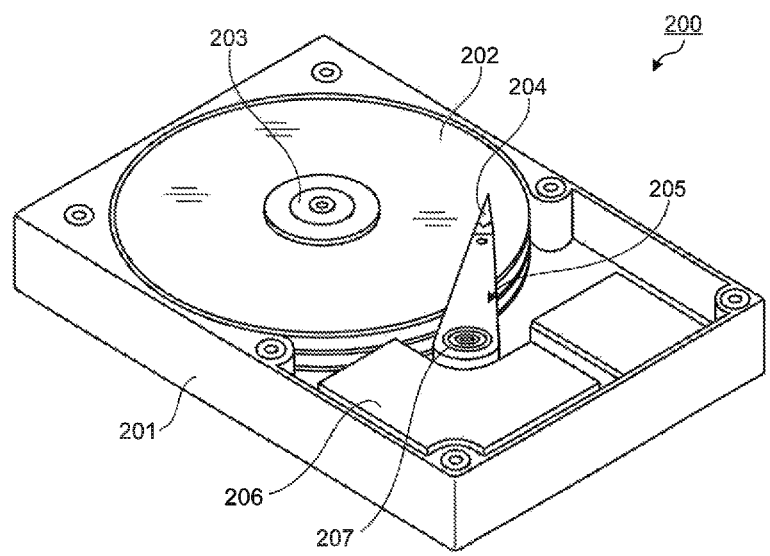
FIG. 20 is a perspective view illustrating a general construction of a conventional hard disk device.

FIG. 19 is a schematic perspective view illustrating a construction of a tolerance ring in a hard disk device in a fourth modification of an embodiment of the present invention. In the first and second modifications, the notches 84a, 84b have been explained as being provided at both ends in the outer edge-side end in a direction perpendicular to a longitudinal direction of the tolerance ring. A construction as in a tolerance ring 8c illustrated in FIG. 19 may be adopted in which one or a plurality (two in the fourth modification) of notches 84a are provided on one end side. In this case, preferably, the end at which the notch 84a is provided is the end remote from the pivot shaft 7 insertion side of the tolerance ring 8c.

Further, as in the tolerance ring 8c in the fourth modification, when the notch is provided on one end side, the provision of the notch at the end remote from the pivot shaft 7 insertion side of the tolerance ring 8c can realize a significantly enhanced rotation suppression effect of the carriage 5. Specifically, when a 1.0 mm-long notch is formed in a widthwise direction (a direction perpendicular to the circumferential direction), as compared with the formation of a 0.5 mm-long notch at both ends, the formation of a 1.0 mm-long notch at one end (an end remote from the pivot shaft 7 insertion side) can realize a significantly enhanced rotation suppression effect of the carriage 5.

Preferably, one or a plurality of notches are provided at positions determined by dividing a side in the longitudinal direction in equal parts. When a plurality of notches are provided, these notches may be the same or different in the length of the extended portion 841 (length in a direction perpendicular to the longitudinal direction of the tolerance ring).

INDUSTRIAL APPLICABILITY

As described above, the tolerance ring according to the present invention is useful for suppressing an increase in unevenness of rigidity and maintaining the stability of fixation between the carriage and the pivot shaft.

REFERENCE SIGNS LIST 1, 200 HARD DISK DEVICE
2, 201 CASING BODY
3, 202 HARD DISK
4, 203 SPINDLE
5, 205, C CARRIAGE
6, 206 VCM
7, 207, M PIVOT SHAFT
8, 8a, 8b, 8c TOLERANCE RING
50 MAGNETIC HEAD UNIT
50a SUSPENSION
50b, 204 MAGNETIC HEAD
51 ARM
52 CONNECTOR
60 COIL
61 MAGNET
81, B, B1 to B6 PROTRUSION
82, 83 END
84a, 84b NOTCH
841 EXTENDED PORTION
842, 843 FRONT END

The invention claimed is:

1. A tolerance ring formed of a plate member, in a ring shape that is substantially circular along a predetermined direction, and provided with a plurality of protrusions projected radially in a circumferential direction, wherein
an even number of the protrusions are arranged along the circumferential direction,
a plurality of straight lines that pass through a central portion of the plurality of protrusions and a center of a circle that circumscribes the tolerance ring cross one another, and
when the protrusion is regarded as a spring, both ends of which are fixed respectively to the central portion of the protrusion and the center of the circumscribed circle, when the protrusions have an identical spring constant, and when the combined spring constant depending upon a rotation angle ($\theta$) around the center from a reference radial direction in the circumscribed circle is $K(\theta)$, the central portion of the plurality of protrusions is located at a position corresponding to any of a plurality of rotation angles ($\theta$) that provide the maximum or minimum combined spring constant $K(\theta)$.

2. The tolerance ring according to claim 1, wherein, when the number of the plurality of protrusions is $N_{a,b}=a \times 2^b$ where $a=1, 3, 5, \ldots, b=1, 2, \ldots$, each of the protrusions is provided in a radial direction rotated by an angle $\theta_{\alpha,\beta}$ defined in Equation (1) around the center of the circumscribed circle from a reference radial direction in the circumscribed circle:

$$\theta_{\alpha,\beta} = \alpha\theta_a + \beta\theta_b + m_{\alpha,\beta}\pi \quad (1)$$

where $\theta_a = 2\pi/a$, $\theta_b = \pi/N_{a,b}$, $\alpha = 0, 1, 2, \ldots, \beta = 0, 1, 2, \ldots, m_{\alpha,\beta} = 0, 1, \alpha \leq a-1$, and $\beta \leq 2b-1$.

3. The tolerance ring according to claim 1, further comprising a notch formed by cutting out, in a direction perpendicular to the circumferential direction, a portion from at least one peripheral side edge in a direction perpendicular to the circumferential direction.

4. The tolerance ring according to claim 3, wherein one or a plurality of the notches is/are provided at the one peripheral side edge.

5. The tolerance ring according to claim 1, wherein the radius of curvature at an edge in the circumferential direction is smaller than that of portions other than the edge in the circumferential direction.

6. The tolerance ring according to claim 5, wherein the radius of curvature decreases continuously from the portions other than the edge towards the edge.

7. The tolerance ring according to claim 1, wherein
the plurality of protrusions are arranged along the circumferential direction, and
among the protrusions arranged along the circumferential direction, the number of protrusions arranged in a row is multiples of 3.

8. A tolerance ring formed of a plate member, in a ring shape that is substantially circular along a predetermined direction, and provided with a plurality of protrusions projected radially in a circumferential direction, wherein
an even number of the protrusions are arranged along the circumferential direction,
a plurality of straight lines that pass through a central portion of the plurality of protrusions and a center of a circle that circumscribes the tolerance ring cross one another, and
when the number of the plurality of protrusions is $N_{a,b}=a\times 2^b$ where $a=1, 3, 5, \ldots$, $b=1, 2, \ldots$, each of the protrusions is provided in a radial direction rotated by an angle $\theta_{\alpha,\beta}$ defined in Equation (1) around the center of the circumscribed circle from a reference radial direction in the circumscribed circle:

$$\theta_{\alpha,\beta}=\alpha\theta_a+\beta\theta_b+m_{\alpha,\beta}\pi \quad (1)$$

where $\theta_a=2\pi/a$, $\theta_b=\pi/N_{a,b}$, $\alpha=0, 1, 2, \ldots$, $\beta=0, 1, 2, \ldots$, $m_{\alpha,\beta}=0, 1$, $\alpha\leq a-1$, and $\beta\leq 2b-1$.

9. The tolerance ring according to claim 8, further comprising a notch formed by cutting out, in a direction perpendicular to the circumferential direction, a portion from at least one peripheral side edge in a direction perpendicular to the circumferential direction.

10. The tolerance ring according to claim 9, wherein one or a plurality of the notches is/are provided at the one peripheral side edge.

11. The tolerance ring according to claim 8, wherein the radius of curvature at an edge in the circumferential direction is smaller than that of portions other than the edge in the circumferential direction.

12. The tolerance ring according to claim 11, wherein the radius of curvature decreases continuously from the portions other than the edge towards the edge.

13. The tolerance ring according to claim 8, wherein
the plurality of protrusions are arranged along the circumferential direction, and
among the protrusions arranged along the circumferential direction, the number of protrusions arranged in a row is multiples of 3.

* * * * *